Patented Feb. 26, 1935

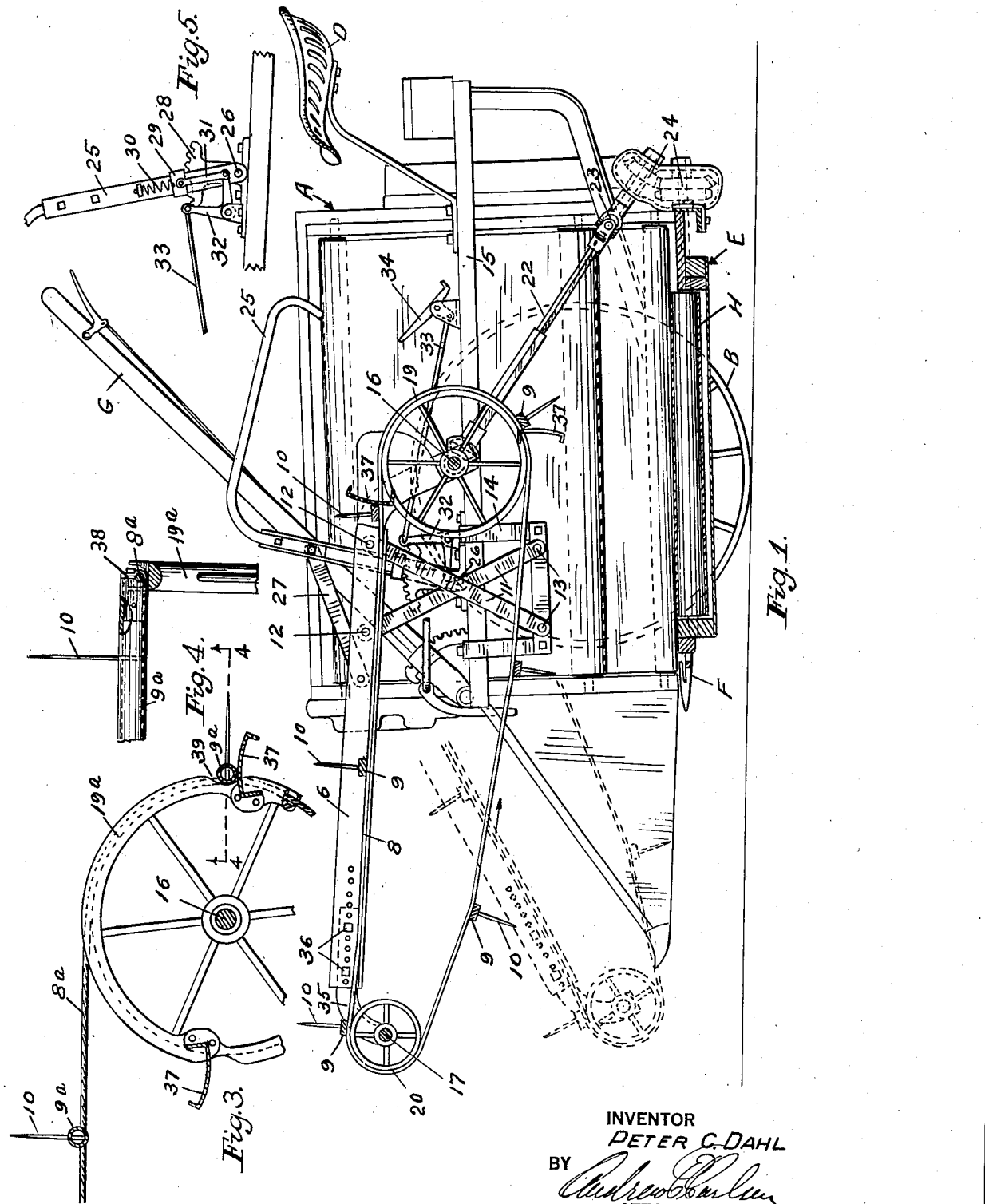

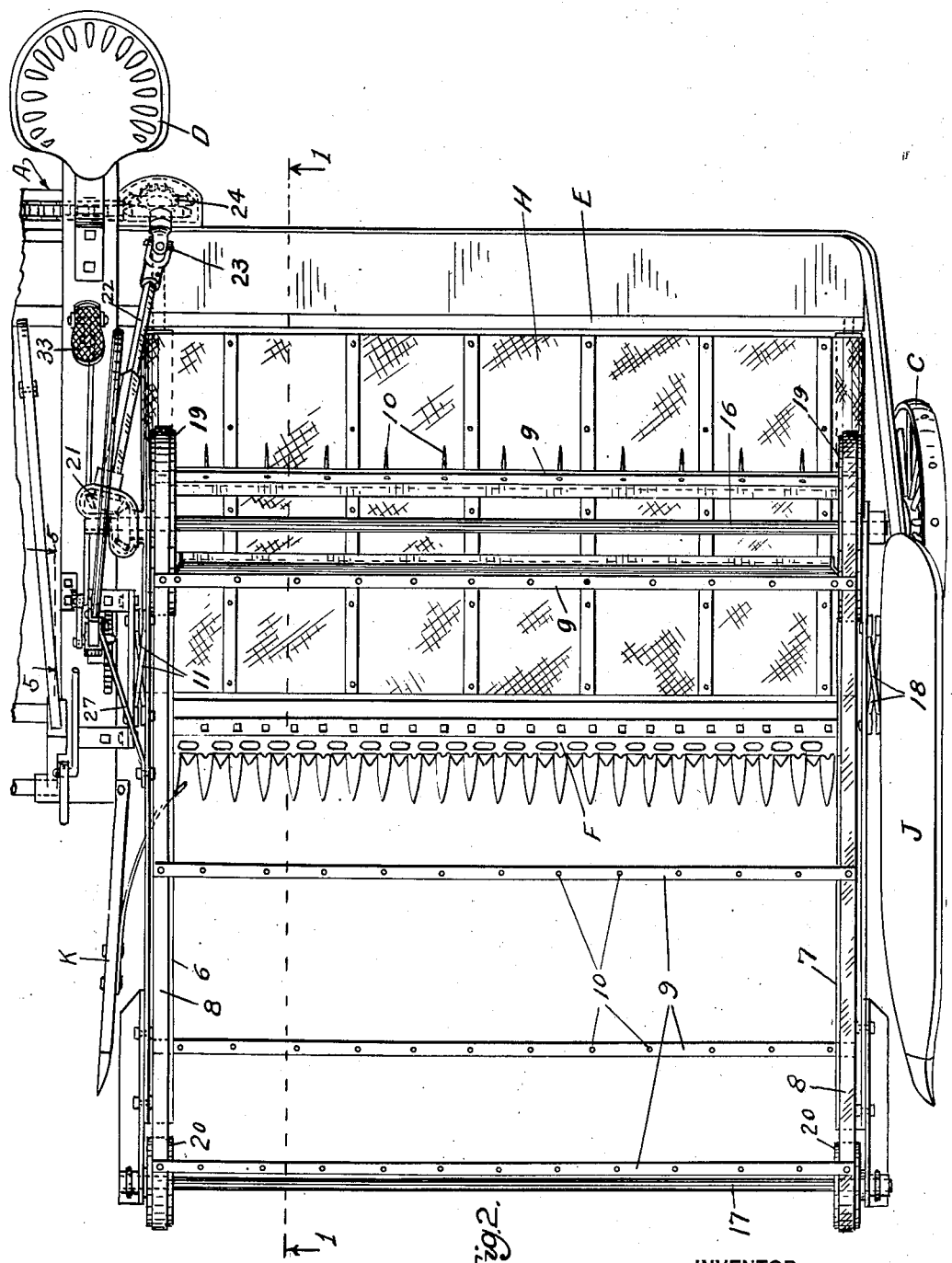

1,992,652

UNITED STATES PATENT OFFICE 1,992,652

HARVESTING MACHINE

Peter C. Dahl, Minneapolis, Minn.

Application April 6, 1934, Serial No. 719,342

10 Claims. (Cl. 56—219)

This invention relates to grain harvesting machinery of the binder or header type, and the primary object is to provide a novel, efficient and practical mechanism for engaging the growing grain in advance of the cutter bar and receiving conveyor, and properly directing and controlling its movement whereby the harvester may operate with a maximum degree of efficiency. Heretofore it has been the practice to employ a rotating skeleton reel to engage the grain, bring it into contact with the cutters and then lay it on the receiving platform or conveyor, but such reels are inefficient and not entirely satisfactory because their grain engaging cross slats move in an arc, which is not consistent with the relative grain movement direction, and in no instance do such reels in any way help to raise or feed in the wind or rain fallen grain which consequently escapes the cutter bar and is therefore lost. The present invention contemplates the use of a skeleton type but endless feed conveyor which projects forwardly over and from the receiving platform and operates over two longitudinally spaced axes whereby the lower, grain engaging run will move horizontally rearwardly, and provision is made for vertically adjusting the foremost axis so that the feed direction angle may be varied, and so that the forward end of the device may be lowered to a point in advance of the cutters, where it will engage and feed back the fallen grain as the machine moves forwardly. To further assist in retrieving the fallen grain I provide the cross bars of my feed conveyor with spaced prongs which have a rake action upon the low grain and virtually pick it up off the ground, thus preventing any appreciable amount of grain from being lost to the harvester. As a further feature of my invention I provide novel devices for mounting, adjusting, and driving my improved gathering and feeding mechanism. Still other more detailed and specific objects will be disclosed in the course of the following specification, reference being had to the accompanying drawings, wherein:

Fig. 1 is a sectional elevation through the harvester and gathering apparatus, this section being taken about as on the line 1—1 in Fig. 2. This view further illustrates by means of dotted lines the lowered position of the front end of the gathering device.

Fig. 2 is a plan view of the receiving platform and adjacent parts of a conventional harvester, and illustrating my invention as embodied and associated therewith.

Fig. 3 is an enlarged detail sectional elevation showing a modified form of conveyor pulley, and substituting a cable and cross pipes for the belt and cross slats of the gathering apparatus as illustrated in Fig. 1.

Fig. 4 is an enlarged detail sectional view on the line 4—4 in Fig. 3.

Fig. 5 is a detail elevation of the position adjusting device as seen when looking in the direction of the arrows 5—5 in Fig. 2.

Referring to the drawings more particularly and by reference characters, A designates the main body portion of a header or binder having a main or bull wheel B, a lateral supporting wheel C, an operator's station D, and a grain receiving platform designated generally by the letter E, and the forward end of this platform carrying a cutter bar F may be raised or lowered by a hand lever G within reach of the operator when seated in the seat D. The receiving platform E includes an endless conveyor apron H, which is adapted to receive the cut grain as it is severed by the cutter bar F, and carry it into the main part of the machine. The receiving platform E also carries a pair of lateral grain guiding members J and K adapted to guide the grain into contact with the cutter bar F as the machine moves forwardly.

The parts thus far described are of common and well known construction, and form no part of the present invention except insofar as they cooperate with the apparatus which I have designed and applied to this type of machine with the advantages heretofore noted.

The grain picking, conveying, and guiding apparatus which I have designed for more effectively controlling the movement of grain into the cutter bar and upon the platform conveyor H, includes two side frame members 6 and 7 preferably formed of angle iron with their horizontal flange portions extending inwardly to form supports for the upper runs of the endless conveyor belts 8, which belts are connected at spaced intervals by cross slats 9, each of which is in turn provided with a series of spaced prongs 10. The frame bar 6, as shown particularly in Fig. 1, is primarily supported and adjustably carried by a pair of links 11 which are pivotally secured at their upper ends as at 12, while the lower ends of these links are pivotally secured as at 13 to a supplemental portion 14 of the main frame 15 of the harvester. The frame bar 7 is connected to the bar 6 through a pair of shafts 16 and 17 so that the bars 6 and 7 will be maintained in parallelism at all times. To this end also the bar 7 is supported from or connected to the outer end of the platform frame by a pair of links 18, which, while not shown in plan elevation in Fig. 1, are designed exactly like the links 11 as to lengths and pivot centers so that the movement of the bar 7 will be identical with the movement of the bar 6.

The shafts 16 and 17 are respectively provided near their outer ends with pulleys 19 and 20 about which extend the belts 8; and power is supplied to drive the pulleys 19 and 20 and the belts 8 by a mechanism including a pair of encased bevel gears 21, one of which is attached to the shaft 16 and the other is attached to a shaft 22, the lower end of which has a universal joint connection 23 with a stub shaft extending from enclosed gears 24, which in turn receive their power from one of the conveyor (H) shafts or from some other power shaft of the machine. It will be noted that the power takeoff shaft 22 is sectionally formed with one part telescoping with another, the purpose being to provide for differences between the centers 16 and 23 when the gathering frame is being tilted to different operating positions, and so that this may be done without in any way interfering with the power action.

The grain gathering and feeding frame is adjusted to different operative positions by a hand lever 25, also within convenient reach of the operator at the station D, and this lever is fulcrumed as at 26 to the main frame 15, and has a pivotal link connection 27 between itself and the frame bar 6, as shown in Fig. 1. The lever 25 is maintained in adjustable set positions by a toothed segment 28 to which the lever is preferably pivoted, and which segment may be releasably engaged by a tooth of a collar 29 which is slidably secured upon a lower part of the lever 25, and is spring held down into engagement with the segment by a spring 30. The collar 29 is connected by a link 31 to a bell crank lever 32, which in turn is controlled by a rod 33 extending from a foot pedal 34. Thus when the operator desires to vertically adjust the front end of the frame he first releases it by depressing the foot lever 34 and then operates the hand lever 25 to tilt the frame as desired, whereupon the foot lever is released so that the segment 28 will be re-engaged to thus lock the frame in the desired position. It may here be stated that the adjusting and securing mechanism just described is merely illustrative of one method by which this action and control may be effected, and obviously modified structures may be employed for this purpose if and when found necessary.

In order to take up slack or when necessary to loosen the belt 8 I preferably secure the shaft 17 in a pair of bracket extensions 35, which may be adjustably secured with respect to the bars 6 and 7 as by bolts 36.

The pulleys 19 at the rear end of the grain feeding frame are rigidly connected by a pair of channel shaped actuator plates or cross beams 37, which are spaced at a circumferential distance equal to the distance between any two adjacent cross slats 9 so that as the conveyor operates these plates 37 will engage the slats 9 as they approach the pulleys 19, and thus positively engage the slats throughout their entire lengths as they rotate around with the pulleys, thus not only reinforcing the slats during this period of movement, but also tending to brace the entire structure, and have as a further function to clear the prongs 10 of grain and then properly lay the grain down upon the receiving conveyor H. They also of course give a positive action to the conveyor belts 8 so that there can be no possible slippage thereof on the pulleys.

In the modification shown in Figs. 3 and 4, the pulleys 19a are of the grooved type, and are substituted for pulleys such as 19 when it is found preferable to employ cables 8a for the belts 8. In this case also I have substituted pipes 9a for the cross slats 9, and in these pipes the prongs 10 are rigidly secured, as shown. The pipes are secured to the cables 8a by small clamping devices such as 38 (Fig. 4), and the flanges of the pulleys 19a are notched out as at 39 adjacent the cross members 37 so as to receive the pipes 9a as they pass around the pulley.

The operation of the machine may be briefly described as follows:

The harvester proper of course functions in its usual manner, and as it progresses over the field the grain is cut by the cutter bar F before it falls upon the conveyor H. When the gathering and guiding frame is tilted downwardly, however, as indicated by dotted lines in Fig. 1, or to even a lower position, it will be seen that the prongs 10 will quite positively engage the grain even though it be in a comparatively low position as occurs after a heavy rain or wind; and as the prongs move rearwardly under the conveyor frame they will, with the assistance of the slats 9, (or 9a) feed the grain positively into contact with the cutter bar; and as the grain is thus severed it will be moved rearwardly and partially through the clearing action of the cross members 37, and under the action of gravity will be stripped from the cross bars and deposited upon the endless conveyor H. It will thus be seen that the cross bars and prongs will, over a considerable length of movement, follow the substantial and proper rearward movement of the grain with respect to the machine as the machine moves forwardly, and this in turn will result in a more efficient and proper handling of the grain than with prior devices which have come to my knowledge.

It may here be explained that the gathering and conveying apparatus does not tilt on a fixed fulcrum when manipulated by the lever 25, but the two pairs of cross levers 11 and 18 are so arranged that they will not only present a movable support for the frame 6—7, but will constitute a shifting fulcrum whereby when the frame is lowered the front end of it will also advance and have a tilting or dipping action and may even be lowered to a point below the cutter bar F should it be so desired. In any event the adjusting arrangement is such that the conveyor tines 10 can at no time come into contact with the cutter bar.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a traveling harvester the combination including a wheel supported frame adapted to be propelled over a grain field, a transversely arranged cutter bar carried by the frame for cutting the grain, a platform extending rearwardly from the cutter bar for receiving the cut grain, an endless conveyor, movable over two spaced axes one of which is disposed in advance of the cutter bar, for engaging the grain and bringing it into contact with the cutter bar, said conveyor comprising endless flexible members connected by cross bars, and power driven means including actuator bars rotatably movable about one of said axes and successively engageable lengthwise with the cross bars for reinforcing the latter and clearing the same of grain adhering thereto.

2. In combination with the cutter bar and receiving platform of a traveling harvester, of a conveyor frame disposed above and extending forwardly of the cutter bar, means for tiltably and forwardly adjusting the frame, pairs of pulleys mounted in fore and aft ends of the frame, and a power driven endless conveyor carried by said pulleys and having spaced, transversely extending grain engaging cross members, said conveyor frame being adjustably secured to the harvester by two pairs of links, one pair at each side of the frame, and permitting adjustments forwardly and downwardly or rearwardly and upwardly with respect to the cutter bar.

3. In combination with the cutter bar and receiving platform of a traveling harvester, of a conveyor frame disposed above and extending forwardly of the cutter bar, means for tiltably adjusting the frame, pairs of pulleys mounted in fore and aft ends of the frame, and a power driven endless conveyor carried by said pulleys and having spaced, transversely extending grain engaging cross members, said conveyor frame being adjustably secured to the harvester by two pairs of links, one pair at each side of the frame, said links of each pair being crossed and paralleled with corresponding links of the other pair so as to constitute a movable fulcrum for the frame.

4. In combination with the cutter bar and receiving platform of a traveling harvester, of a conveyor frame disposed above and extending forwardly of the cutter bar, an endless conveyor mounted in the frame, means for mounting the frame on the harvester whereby the front end of the frame may be adjusted downwardly and forwardly or rearwardly and upwardly, a lever mounted on the harvester with manually operative means for releasably securing the lever in various adjusted positions, and a link device connecting the lever with the conveyor frame.

5. In combination with the cutter bar and receiving platform of a traveling harvester, of a conveyor frame disposed above and extending forwardly of the cutter bar, means for tiltably adjusting the frame, pairs of pulleys mounted in fore and aft ends of the frame, a pair of endless flexible elements connecting said pulleys, one element adjacent each side of the frame, cross bars connecting the endless elements at spaced intervals, and elongated actuator plates, arranged in parallelism with the cross bars for engaging and clearing grain from the same, and being rigidly secured at their opposite ends to the rearmost pair of said pulleys; and means for applying power to said last mentioned pulleys.

6. In combination with the main frame, cutter bar, and grain receiving platform of a traveling harvester, of a secondary frame disposed above and extending forwardly of the cutter bar, power actuated means carried by the secondary frame for engaging growing grain and conveying it into contact with the cutter bar as the machine moves forwardly, and adjustable mounting means connecting the two frames including a movable fulcrum support and a manual controlled member for the secondary frame causing the forward part of the secondary frame, when adjusted on said fulcrum support, to simultaneously move forwardly and downwardly or rearwardly and upwardly with respect to the cutter bar.

7. In combination with the main frame, cutter bar, and grain receiving platform of a traveling harvester, of a secondary frame disposed above and extending forwardly of the cutter bar, power actuated means carried by the secondary frame for engaging growing grain and conveying it into contact with the cutter bar as the machine moves forwardly, and adjustable mounting means connecting the two frames and constituting a movable fulcrum for the secondary frame, said mounting means including two pairs of links connected at upper and lower ends to the respective frames, the pairs of links being at opposite sides of the secondary frame.

8. In combination with the main frame, cutter bar, and grain receiving platform of a traveling harvester, of a secondary frame disposed above and extending forwardly of the cutter bar, power actuated means carried by the secondary frame for engaging growing grain and conveying it into contact with the cutter bar as the machine moves forwardly, and adjustable mounting means connecting the two frames and constituting a movable fulcrum for the secondary frame, said mounting means including two pairs of crossed links, one pair at each side of the secondary frame and the links of each pair being movable in parallelism with the corresponding links of the other pair.

9. In a traveling harvester the combination including a wheel supported frame adapted to be propelled over a grain field, a transversly arranged cutter bar carried by the frame for cutting the grain, a platform extending rearwardly from the cutter bar for receiving the cut grain, an endless conveyor, movable over two spaced axes one of which is disposed in advance of the cutter bar, for engaging the grain and bringing it into contact with the cutter bar, said conveyor comprising endless flexible members connected by cross bars, and power driven means including actuator bars rotatably movable about one of said axes and successively engageable lengthwise with the cross bars for reinforcing the latter and clearing the same of grain adhering thereto, said actuator bars being curved in cross section.

10. In combination with the cutter bar and receiving platform of a traveling harvester, of a conveyor frame disposed above and extending forwardly of the cutter bar, means for tiltably adjusting the frame, pairs of pulleys mounted in fore and aft ends of the frame, a pair of endless flexible elements connecting said pulleys, one element adjacent each side of the frame, cross bars connecting the endless elements at spaced intervals, gathering prongs projecting from said cross bars, cross members rigidly connecting the rearmost pair of pulleys, operative to actuate said cross bars and effect a stripping action with respect to the gathering prongs as the cross bars approach said rearmost pulleys and means for applying power to the rearmost pulleys.

PETER C. DAHL.